United States Patent
Bai et al.

(10) Patent No.: US 8,077,603 B2
(45) Date of Patent: Dec. 13, 2011

(54) IEEE 1394 GATEWAY FOR FAULT-TOLERANT COMMUNICATION

(75) Inventors: Haowei Bai, Burnsville, MN (US); Brian VanVoorst, Minneapolis, MN (US); Allalaghatta Pavan, Minneapolis, MN (US); Vicraj T. Thomas, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 790 days.

(21) Appl. No.: 11/260,332

(22) Filed: Oct. 27, 2005

(65) Prior Publication Data

US 2006/0092977 A1 May 4, 2006

Related U.S. Application Data

(60) Provisional application No. 60/623,704, filed on Oct. 29, 2004.

(51) Int. Cl.
*H04J 1/00* (2006.01)
(52) U.S. Cl. .............................. 370/218; 370/401; 714/2
(58) Field of Classification Search .......... 370/217–218, 370/257; 714/1–9
See application file for complete search history.

(56) References Cited

U.S. PATENT DOCUMENTS

| 6,272,114 | B1 * | 8/2001 | Kobayashi | 370/257 |
|---|---|---|---|---|
| 6,618,361 | B1 * | 9/2003 | Park | 370/257 |
| 6,633,575 | B1 * | 10/2003 | Koodli | 370/412 |
| 6,693,912 | B1 | 2/2004 | Wang | |
| 6,775,245 | B1 * | 8/2004 | Ishida et al. | 370/257 |
| 6,807,148 | B1 * | 10/2004 | Eicher | 370/217 |
| 6,820,150 | B1 | 11/2004 | Joy et al. | |
| 7,133,407 | B2 | 11/2006 | Jinzaki et al. | |
| 2002/0027927 | A1 * | 3/2002 | Barzegar et al. | 370/436 |
| 2002/0035623 | A1 * | 3/2002 | Lawande et al. | 709/221 |
| 2002/0061025 | A1 * | 5/2002 | Masunaga et al. | 370/402 |
| 2005/0012399 | A1 * | 1/2005 | Yoshida | 307/125 |
| 2006/0002314 | A1 * | 1/2006 | Fukunaga et al. | 370/257 |
| 2006/0095597 | A1 | 5/2006 | Bai et al. | |
| 2006/0153228 | A1 * | 7/2006 | Stahl et al. | 370/466 |

* cited by examiner

*Primary Examiner* — Pao Sinkantarakorn
(74) *Attorney, Agent, or Firm* — Fogg & Powers LLC

(57) ABSTRACT

In one embodiment, a node comprises a plurality of IEEE 1394 subnet interfaces for communicating over a plurality of IEEE 1394 buses. Each of the plurality of IEEE 1394 subnet interfaces comprises a respective IEEE 1394 physical layer and IEEE 1394 link layer for communicating over a respective one of the plurality of IEEE 1394 buses. At least the IEEE 1394 physical layers for the plurality of subnet interfaces do not share hardware. The node further comprises at least one programmable processor that executes software that comprises common network layer functionality that interacts with all of the plurality of IEEE 1394 subnet interfaces and routes IEEE 1394 data packets among the plurality of IEEE 1394 buses.

28 Claims, 5 Drawing Sheets

| IPV6 TRAFFIC CLASS | IEEE 1394B CLASS OF SERVICE |
|---|---|
| Best Effort (0) | Asynchronous |
| Background (1) | Asynchronous |
| Standard (2) | Asynchronous |
| Excellent Effort (3) | Isochronous |
| Streaming Multimedia (4) | Isochronous |
| Interactive Multimedia (5) | Isochronous |
| Interactive Voice (6) | Isochronous |

FIG. 3A

| IPV6 TRAFFIC CLASS | IEEE 1394B PRIORITY |
|---|---|
| Best Effort (0) | Low |
| Background (1) | Medium |
| Standard (2) | High |

FIG. 3B

IEEE 1394 GATEWAY FOR FAULT-TOLERANT COMMUNICATION

RELATED CASE

This application claims the benefit of U.S. Provisional Application No. 60/623,704, filed on Oct. 29, 2004, which is incorporated herein by reference in its entirety.

This application is related to U.S. patent application Ser. No. 11/260,818, with a title "IEEE 1394 NETWORK FOR DETERMINISTIC AND/OR FAULT-TOLERANT COMMUNICATION", filed on even date herewith, which is incorporated herein by reference in its entirety.

BACKGROUND

The Institute of Electrical and Electronics Engineers (IEEE) has promulgated a family of standards for high performance serial buses (also referred to here as "IEEE 1394"). The IEEE 1394 family of standards includes IEEE Std. 1394-1995, the IEEE Std. 1394a-2000 amendment (also referred to here as "IEEE 1394a"), and the IEEE Std. 1394b-2002 amendment (also referred to here as "IEEE 1394b"). However, typical networks that implement such IEEE 1394 standards may not be suitable for some applications that require a high degree of fault tolerance and/or deterministic communication (for example, in systems that control and/or monitor vehicles such as aerospace vehicles).

SUMMARY

In one embodiment, a node comprises a plurality of IEEE 1394 subnet interfaces for communicating over a plurality of IEEE 1394 buses. Each of the plurality of IEEE 1394 subnet interfaces comprises a respective IEEE 1394 physical layer and IEEE 1394 link layer for communicating over a respective one of the plurality of IEEE 1394 buses. At least the IEEE 1394 physical layers for the plurality of subnet interfaces do not share hardware. The node further comprises at least one programmable processor that executes software that comprises common network layer functionality that interacts with all of the plurality of IEEE 1394 subnet interfaces and routes IEEE 1394 data packets among the plurality of IEEE 1394 buses.

In another embodiment, a system comprises a plurality of nodes that communicate with one another over a plurality of IEEE 1394 buses. Each of the plurality of nodes comprises a plurality of IEEE 1394 subnet interfaces for communicating over the plurality of IEEE 1394 buses, wherein each of the plurality of IEEE 1394 subnet interfaces comprises a respective IEEE 1394 physical layer and IEEE 1394 link layer for communicating over a respective one of the plurality of IEEE 1394 buses, wherein at least the IEEE 1394 physical layers for the plurality of subnet interfaces do not share hardware. Each of the plurality of nodes implement common network layer functionality that interacts with all of the plurality of IEEE 1394 subnet interfaces and routes IEEE 1394 data packets among the plurality of IEEE 1394 buses.

In another embodiment, a method comprises receiving IEEE 1394 data packets from a plurality of IEEE 1394 buses using separate IEEE 1394 subnet interfaces. Each of the plurality IEEE 1394 buses has a respective IEEE 1394 subnet interface. Each IEEE 1394 subnet interface comprises a respective IEEE 1394 physical layer and a respective IEEE 1394 link layer. At least the IEEE 1394 physical layers for the plurality of IEEE 1394 subnet interfaces do not share hardware. The method further comprises forwarding the IEEE 1394 data packets among the plurality of IEEE 1394 buses using a common network layer.

In another embodiment, an apparatus comprises a storage medium that tangibly embodies program instructions. The program instructions comprise instructions operable to cause a programmable processor to receive IEEE 1394 data packets from a plurality of IEEE 1394 buses using separate IEEE 1394 subnet interfaces. Each of the plurality IEEE 1394 buses has a respective IEEE 1394 subnet interface, wherein each IEEE 1394 subnet interface comprises a respective IEEE 1394 physical layer and a respective IEEE 1394 link layer. At least the IEEE 1394 physical layers for the plurality of IEEE 1394 subnet interfaces do not share hardware. The program instructions further comprise instructions operable to cause a programmable processor to forward the IEEE 1394 data packets among the plurality of IEEE 1394 buses using a common network layer.

The details of various embodiments of the claimed invention are set forth in the accompanying drawings and the description below. Other features and advantages will become apparent from the description, the drawings, and the claims.

DRAWINGS

FIGS. 3A-3B illustrate an exemplary embodiment of a mapping of an IPV6 traffic class to an IEEE 1394b class of service and an exemplary embodiment of a mapping of an IPV6 traffic class to an IEEE 1394 priority, respectively.

Like reference numbers and designations in the various drawings indicate like elements.

DETAILED DESCRIPTION

Figure 1:
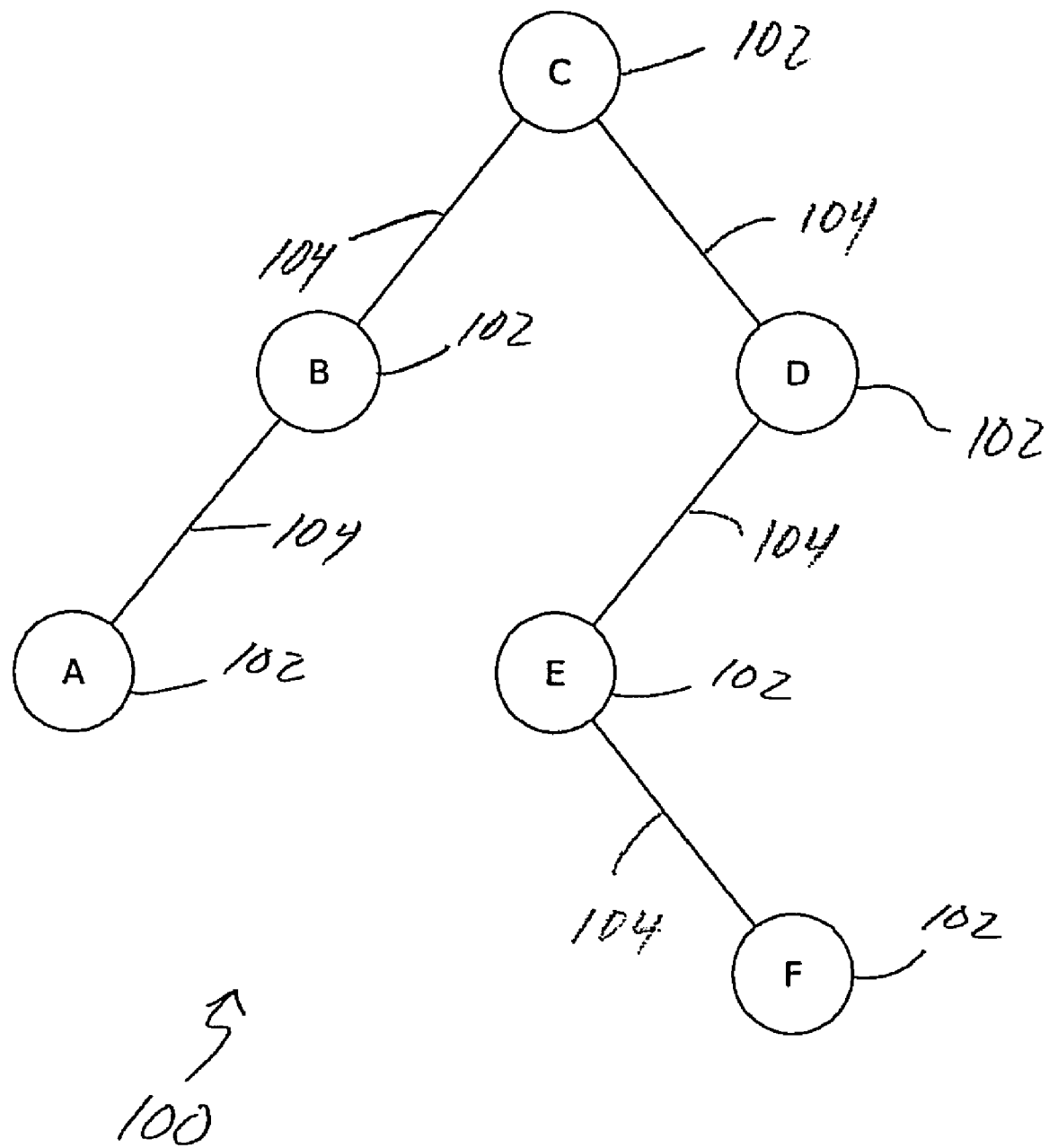
FIG. 1 is a block diagram of one embodiment of an IEEE 1394 network.

FIG. 1 is a block diagram of one embodiment of an IEEE 1394 network 100. The network 100 comprises at least two nodes 102 that communicate over an IEEE 1394 bus (although it is to be understood that one or more of the nodes 102 may communicate with each other and/or with other nodes over other IEEE 1394 buses and/or over other communication links). In one implementation of such an embodiment, the IEEE 1394 bus comprises at least one of an IEEE 1394a bus, an IEEE 1394b bus, a bus that supports IEEE 1394a link layer devices and IEEE 1394b physical layer devices, and a bus that supports IEEE 1394b link layer devices and IEEE 1394a physical layer devices, or a "bilingual" bus having a bilingual bridge that supports both IEEE 1394a and IEEE 1394b segments. In the embodiment shown in FIG. 1, six nodes 102 are shown (though other numbers of nodes 102 are used in other embodiments) and each of the nodes 102 are individually labeled as node A, node B, node C, node D, node E, and node F, respectively.

The various nodes of the network 100 communicate using IEEE 1394 bi-directional communication links 104 that support one or more of the IEEE 1394 family of standards (also referred to here as "IEEE 1394 links"). For example, in one implementation of such an embodiment, each of the links 104 supports the IEEE 1394b standard. The network 100 has a rooted half-binary topology in which the topology of the network 100 is pre-configured, in which the relationship among the various nodes 102 is pre-configured. That is, one of the plurality of nodes 102 is pre-selected as a "root" node 102 while the other nodes 102 are "child" nodes. The root node has no "parent" node and at most two child nodes. Each node 102 that is pre-selected as child node has one parent node and at most one child node. A child node that does not, itself, have a child node is also referred to here as a "leaf" node. In the particular embodiment shown in FIG. 1, node C is the root node, the other nodes 102 are child nodes, and nodes A and F are leaf nodes.

In such an embodiment, the various protocols and layers defined in the IEEE 1394 family of standards are used to facilitate configuration, control, and/or communication over the network 100 of FIG. 1 except that, since the topology of the network 100 is pre-configured (and includes a pre-selected root node 102), the root-election and tree-identity processing described in the IEEE 1394 family of standards need not be performed. By not performing such root-election and tree-identity processing, the delay that would otherwise occur during such processing can be avoided when a node is added to or removed from the network 100).

In the embodiment shown in FIG. 1, each node 102 included in the network 100 need only have two ports to interface with other nodes 102 over the network 100. For example, a node 102 that is pre-selected as the root node for the network 100 includes a port for each of the at most two child nodes 102 to which the root node can be communicatively coupled. A node 102 that is a child node includes a port to communicatively couple that child node to its parent node and a port to communicatively couple that child node to its at most one child node. When such a network 100 having a rooted half-binary tree topology is used in a fault-tolerant application such as the one described below in connection with FIG. 4, each node 102 in network 100 need not include as many ports as would be needed if the node was used some other fault-tolerant topologies such as the stack-tree based topology (which would typically require at least three ports). As a result, the extra weight and cost associated with such additional ports can be avoided in the nodes 102 when used in such a rooted half-binary topology network 100 in a fault-tolerant configuration.

Figure 2:
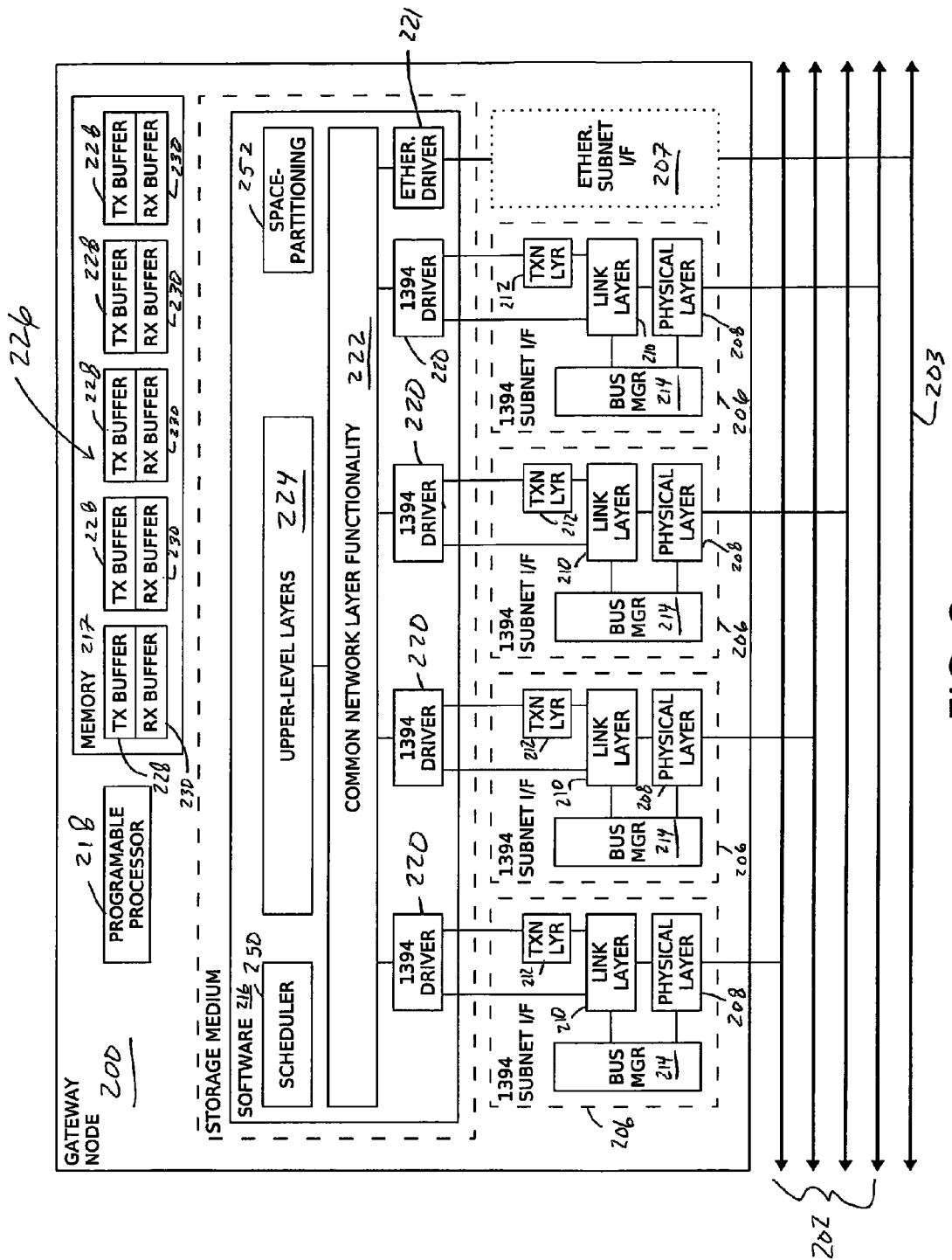
FIG. 2 is a block diagram of one embodiment of a gateway node for use in a system that makes use of IEEE 1394 communication buses.

FIG. 2 is a block diagram of one embodiment of a gateway node 200 for use in a system that makes use of IEEE 1394 communication buses. The gateway node 200 is suitable for use, for example, with one or more IEEE 1394 buses that make use of the rooted half-binary topology shown in FIG. 1. In one implementation of such an embodiment, the one or more IEEE 1394 buses comprise at least one of an IEEE 1394a bus, an IEEE 1394b bus, a bus that supports IEEE 1394a link layer devices and IEEE 1394b physical layer devices, and a bus that supports IEEE 1394b link layer devices and IEEE 1394a physical layer devices, or a "bilingual" bus having a bilingual bridge that supports both IEEE 1394a and IEEE 1394b segments.

The gateway node 200, in the embodiment shown in FIG. 2, acts as a "gateway" between or among multiple IEEE 1394 buses 202 and provides layer 3 forwarding between the multiple IEEE 1394 buses 202. The gateway node 200 also acts as a "gateway" between or among multiple IEEE 1394 buses 202 and one or more buses that support other communication protocols and forwards packets among support buses that support other communication protocols and provides layer 3 forwarding between the multiple IEEE 1394 buses 202 and such other buses. In the particular embodiment shown in FIG. 2, the gateway node 200 supports one such other bus 203 that supports the IEEE 802.3 family of standards (also referred to here as "ETHERNET). It is to be understood that, in other embodiments, the other buses support other communication protocols such as a wireless communication protocol (for example, the IEEE 802.11 family of standards).

The gateway node 200 comprises multiple subnet interfaces. In the particular embodiment shown in FIG. 2, some of the subnet interfaces are IEEE 1394 subnet interfaces 206 (four IEEE 1394 subnet interfaces 206 are shown in FIG. 2) and some of the other subnet interfaces 207 support other communication protocols. In the particular embodiment shown in FIG. 2, the gateway node 200 comprises one such other subnet interface 207 that supports the IEEE 802.3 family of standards (also referred to here as the "ETHERNET" subnet interface 207). It is to be understood, however, that in other embodiments, other subnet interfaces 207 support other communication protocols such as wireless communication protocol such as the IEEE 802.11 family of standards. Each IEEE 1394 subnet interface 206 comprises an IEEE 1394 physical layer interface 208 that implements the electrical and mechanical interface required for transmission and reception of data bits (in the form of packets) across a respective IEEE 1394 bus 202. Each IEEE 1394 physical layer 208 also provides the initialization and the arbitration services to ensure that only one node on the respective IEEE 1394 bus 202 transfers data at one time across that IEEE 1394 bus 202. In one implementation, each IEEE 1394 physical layer 208 is powered using power provided over the IEEE 1394 bus 202. In another implementation, the IEEE 1394 physical layer 208 is powered using power that is used to power other components of the gateway node 200. Also, each IEEE 1394 physical layer 208 maintains communication continuity on the respective IEEE 1394 bus 202 when the node 200 is powered off.

Each IEEE 1394 subnet interface 206 also comprises an IEEE 1394 link layer 210 that implements packet delivery services for both the asynchronous and isochronous protocols specified in the IEEE 1394 family of standards. For asynchronous protocols, each IEEE 1394 link layer 210 performs packet delivery service between a respective IEEE 1394 physical layer 208 and a respective IEEE 1394 transaction layer 212 (described below). For isochronous protocols, each IEEE 1394 link layer 210 performs packet delivery service directly between a respective IEEE 1394 physical layer 208 and the software 216 (described below) executing on the gateway node 200. Each IEEE 1394 link layer 210 provides isochronous channel cycle control for a respective IEEE 1394 bus 202. Also, Galvanic isolation is usually implemented between a respective IEEE 1394 physical layer 208 and a respective IEEE 1394 link layer 210.

Each IEEE 1394 subnet interface 206 also comprises an IEEE 1394 transaction layer 212 that is used for asynchronous communications over a respective IEEE 1394 bus 202. The IEEE 1394 transaction layer 212 carries out read, write, and lock commands used in the asynchronous protocol as defined in the IEEE 1394 family of standards.

Each IEEE 1394 subnet interface 206 further comprises an IEEE 1394 bus manager 214 that provides overall configuration control of a respective IEEE 1394 bus 202 (including, for example, by optimizing arbitration timing, guaranteeing adequate electrical power for all devices in the bus, determining which device will be the cycle master, assigning isochronous channel ID, and error notifying). In one implementation of such an embodiment, the functionality of the IEEE 1394 bus manager 214 is based on the IEEE 1212 CSR architecture (as specified in the IEEE Std 1212-2001 IEEE Standard for a Control and Status Registers (CSR) Architecture for Microcomputer Buses).

In implementations of the such an embodiment, one or more of the various components of the IEEE 1394 subnet interfaces 202 do not share any hardware (that is, are physically portioned). In one such implementation, at least the IEEE 1394 physical layers 208 for the IEEE 1394 subnet interfaces 202 do not share any hardware. In another implementation, each component of each IEEE 1394 subnet interface 202 shown in FIG. 2 does not share hardware with the respective components of the other IEEE 1394 subnet interfaces 202 (for example, each IEEE 1394 link layer 210 does not share hardware with any other IEEE 1394 link layer 210).

In one implementation of such an embodiment, the IEEE 1394 physical layers 308 the IEEE 1394 subnet interfaces 202 do not share any hardware (that is, the IEEE 1394 physical layers 308 are physically partitioned).

The ETHERNET subnet interface 207 comprises appropriate functionality to implement the ETHERNET communication protocols supported by the ETHERNET subnet interface 207 and communicate over the ETHERNET bus 203. The ETHERNET subnet interface 207 includes, in one implantation, appropriate IEEE 802.3 link layer, media access control layer, and physical layer devices (not shown in FIG. 2).

The gateway node 200, in the embodiment shown in FIG. 2, comprises a programmable processor 218 that executes software 216. The software 216 comprises program instructions that, when executed by the programmable processor 218, perform at least a portion of the processing described here as being performed by the gateway node 200. The software 216 is stored (or otherwise embodied) on or in a storage medium 215 (for example, a read-only memory (ROM) device or flash memory device) from which at least a portion of the software 216 is read by the processor 218 for execution thereby. The gateway node 200 shown in FIG. 2 includes memory 217 in which at least a portion of the software 216 and any data structures used by the software 216 are stored during execution. The memory 217 includes any appropriate type of memory now known or later developed including without limitation, ROM, random access memory (RAM), and a set of registers included within the processor 218.

The software 216 comprises a driver for each of the multiple subnet interfaces supported by the gateway node 200. In the particular embodiment shown in FIG. 2, the software 216 comprises an IEEE 1394 a driver 220 for each IEEE 1394 subnet interface 206 and an appropriate driver 221 for the ETHERNET subnet interface 207 (for example, an ETHERNET driver). Each IEEE 1394 driver 220 interacts with the hardware used to implement the IEEE 1394 link layer 210 of a respective IEEE 1394 subnet interface 206 and serves as the software interface between such an IEEE 1394 link layer 210 and IEEE 1394 transaction layer 212 and the other layers of the software 216. In other words, each IEEE 1394 subnet interface 206 comprises separate IEEE 1394 physical layer 208, IEEE 1394 link layer 210, IEEE 1394 transaction layer 212, and IEEE 1394 driver 220. The ETHERNET driver 221 interacts with the hardware used to implement the ETHERNET subnet interface 207 and serves as the software interface between the hardware used to implement the ETHERNET subnet interface 207 and the other layers of the software 216.

The software 216 comprises common network layer functionality 222 (also referred to here as "layer 3" functionality 222) that interacts with all of the subnet interfaces of the gateway node 200 (that is, the IEEE 1394 subnet interfaces 206 and the ETHERNET subnet interface 207). The common network layer functionality 222 is responsible for transferring variable length data sequences from a source to a destination via one or more IEEE 1394 buses 202 and/or ETHERNET bus 203 while maintaining the quality of service (QoS) requested by higher-level layers of the software 216. The common network layer functionality 222 also performs network routing, flow control, segmentation/desegmentation, and error control functions. The common network layer functionality 222 maps each node on each of the IEEE 1394 buses 202 and the ETHERNET bus 203 of the gateway node 200 to a logical address. In one implementation, the common network layer functionality 222 maintains an appropriate data structure that associates each IEEE 1394 bus identifier known to the gateway node 200 to a respective Internet Protocol version 6 (IPV6) address and uses IPV6 processing to implement network layer functionality (for example, to perform routing and QoS processing). Also, in such an implementation, IPV6 packets are encapsulated in IEEE 1394 packets for communication over the buses 202. In this way, such encapsulated IEEE 1394 packets can be forwarded among the various IEEE 1394 buses 202 and the ETHERNET bus 203.

In one implementation of the embodiment shown in FIG. 2 (for example, in the example described below in connection with FIG. 4), the common network layer functionality 222 is configured to support one or types of protection switching between the multiple subnet interfaces of the gateway node 200. For example, in one such implementation, one of the multiple IEEE 1394 subnet interfaces 202 is identified as a logical "primary" subnet interface 202 and another of the multiple IEEE 1394 subnet interfaces 202 is identified as a "secondary" or "backup" subnet interface 202 for the primary subnet interface 202. The common network layer functionality 222 monitors the health of the primary subnet interface 202 (and the components thereof such as the IEEE 1394 link layer 210 and the IEEE 1394 physical layer 208) and when a particular "failover" condition occurs for the primary subnet interface 202 (for example, a failure of the IEEE 1394 physical layer 208 for the primary subnet interface 202), the common network layer functionality 222 causes all communications that otherwise would have occurred over the primary IEEE 1394 subnet interface 202 to occur over the backup IEEE 1394 subnet interface 202. In another implementation, the common network layer functionality 222 supports protection switching for and among the IEEE 1394 subnet interfaces 202 and any non-IEEE 1394 subnet interfaces supported by the gateway node 200 (for example, the ETHERNET subnet interface 203 as shown in FIG. 2).

The common network layer functionality 222 facilities deterministic communication over the IEEE 1394 buses 202 by, among other things, providing control over the layer-3 forwarding performed by the common network layer functionality 222. In one embodiment, a "traffic forwarding rate" parameter is used to regulate layer-3 forwarding performed by the common network layer functionality 222. In one implementation of such an embodiment, the traffic forwarding rate parameter is a determined based on the topology (or other attributes) of the network in which the gateway node 200 is used and/or on the particular applications for which the network is used. In such an implementation, the traffic forwarding rate parameter is determined when such a network is deployed.

The common network layer functionality 222 also manages buffers 226 that are used for buffering data that is communicated over the buses 202 of the gateway node 200. In the particular embodiment shown in FIG. 2, each subnet interface 206 has an associated pair of configurable buffers—one of which is a configurable transmit buffer 228 and the other of which is a configurable receive buffer 230. The common network layer functionality 222 configures, for example, the buffer size and minimum and maximum queue-depth thresholds for each such buffer in order to make the end-to-end queuing latency controllable and deterministic. The common network layer functionality 222 schedules traffic flowing over the buses 202 in both time and space using the traffic forwarding rate, the buffer size, and minimum and maximum queue-depth thresholds. In one implementation of such an embodiment, the common networking layer functionality 222 uses a random early dropping ("RED") algorithm to make packet-forwarding and dropping decisions.

In the particular embodiment shown in FIG. 2, the software 216 also comprises additional upper-layer functionality 224 (for example, transport, session, presentation, and application layers) that interacts with the common network layer functionality 222 in order to send and receive data over the buses 202.

One embodiment of an IEEE 1394 network that makes use of a gateway node 200 shown in FIG. 2 is described below in connection with FIG. 4 (though it is to be understood that embodiments of the gateway node 200 can be used in other applications).

In the particular embodiment shown in FIG. 2, the gateway node 200 is implemented so as to provide one or more of space partitioning and time portioning among the various subnet interfaces 206. Space partitioning prevents processes or threads associated with each of the subnet interfaces 206 from accessing memory 217 allocated to the other subnet interfaces 206. In the particular embodiment shown in FIG. 2, the software 216 comprises space-partitioning enforcement software 252 (for example, as a part of an operating system or other control system running on the gateway node 200) that enforces a space-partitioning policy in which access to the memory associated with each subnet interface 206 is controlled. In other embodiments and implementations, space partitioning is implemented in other ways (for example, in hardware or combinations of hardware and software). In one such alternative embodiment, space partitioning is implemented by providing physically separate memory devices for the buffers 228 and 230 used by each of the subnet interfaces 206 (as opposed to the "logically" separate buffers shown in FIG. 2) and including appropriate space-partitioning enforcement software 252 to control access to such physically separate memory devices.

In the particular embodiment shown in FIG. 2, the software 216 comprises a scheduler 250 that determines when various processes or threads execute on the programmable processor 218 (resulting, for example, from executing a portion of the software 216). That is, the scheduler 250 implements a time-partitioning policy that allocates a portion of the programmable processor 218 execution time to each of the subnet interfaces 206. For example, in one implementation of such an embodiment, the scheduler 250 enforces time partitioning using an appropriate scheduling policy (for example, a rate monotonic analysis (RMA) scheduling policy). Using this policy, the scheduler 250 determines when each such process or thread should run.

In other embodiments, the gateway node 200 does not implement space partitioning, time partitioning, or both.

The gateway node 200 can act as a different type of node (for example, from a network topology standpoint) for each of the subnet interfaces 206. For example, where the one or more of the IEEE 1394 buses 202 are implemented using a rooted half-binary topology, the gateway node 200 may be, for example, a root node for one or more of the IEEE 1394 buses 202 and a child node or leaf node (that is, a non-root node) for one or more of the other IEEE 1394 buses 202. One implementation of such a network is illustrated in FIG. 4 (described below). In this way, multiple "logical" types of nodes (root nodes and child or leaf nodes) can be implemented using a single physical node, which can reduce the cost and weight associated with implementing an IEEE 1394 network.

FIGS. 3A-3B illustrate an exemplary embodiment of a mapping of an IPV6 traffic class to an IEEE 1394b class of service and an exemplary embodiment of a mapping of an IPV6 traffic class to an IEEE 1394 priority, respectively. In those embodiments where IPV6 packets are encapsulated within IEEE 1394b packets, it may be desirable to use the IPV6 traffic class information contained in each IPV6 data packet in the IEEE 1394b service classification and priority processing performed at each node in an IEEE 1394b network. In one embodiment, each IPV6 traffic class that is used in a given network is mapped to a corresponding IEEE 1394b class of service. Such mapping is also referred to here as a "TC-to-COS" mapping. One example of a TC-to-COS mapping is illustrated in FIG. 3A. As shown in FIG. 3A, best effort, background, and standard IPV6 traffic classes are all mapped to the IEEE 1394b asynchronous class of service. Also, the other IPV6 traffic classes (for example, excellent effort, streaming multimedia, interactive multimedia, and interactive voice classes) are mapped to the IEEE 1394b isochronous class of service. Other mappings are used in other embodiments. When a given IPV6 data packet is encapsulated within an IEEE 1394b data packet, the IEEE 1394b class of service field for the IEEE 1394b data packet is populated with the IEEE 1394b class of service to which the IPV6 traffic class specified in the IPV6 traffic class field of the IPV6 data packet is mapped.

Also, in such an embodiment, each IPV6 traffic class that is mapped to the IEEE 1394b asynchronous class of service is also mapped to a particular IEEE 1394b asynchronous packet priority. Such mapping is also referred to here as a "TC-to-priority" mapping. One example of a TC-to-priority mapping is illustrated in FIG. 3B. As shown in FIG. 3B, the best effort, background, and standard IPV6 traffic classes are mapped to the low, medium, and high IEEE 1394b asynchronous priority values, respectively. Other mappings are used in other embodiments. When a given IPV6 data packet is encapsulated within an IEEE 1394b data packet and is mapped to an asynchronous IEEE 1394b class of service, the IEEE 1394b priority field for the IEEE 1394b data packet is populated with the IEEE 1394b priority value to which the IPV6 traffic class specified in the IPV6 traffic class field of the IPV6 data packet is mapped.

By performing the TC-to-COS mapping and the TC-to-priority mapping when encapsulating an IPV6 data packet for transmission on an IEEE 1394b network, the IEEE 1394b processing performed by each of the nodes of an IEEE 1394b network should deliver a type of service similar to the IPV6 traffic class originally specified in the IPV6 data packet requested by the upper layer functionality. In one implementation of such an embodiment implemented using the gateway node 200 of FIG. 2, the common network layer functionality 222 performs the TC-to-COS and the TC-to-priority mapping when IPV6 data packets are encapsulated within IEEE 1394b packets for transmission on an IEEE 1394b bus. Such an approach typically reduces delays associated with protocol negotiations between the IPV6 layer and the IEEE 1394b layers. One embodiment of an IEEE 1394 network that makes use of such TC-to-COS and TC-to-priority is described in connection with FIG. 4 (though it is to be understood that such mapping techniques can be used in other embodiments, implementations, and applications).

Figure 4:
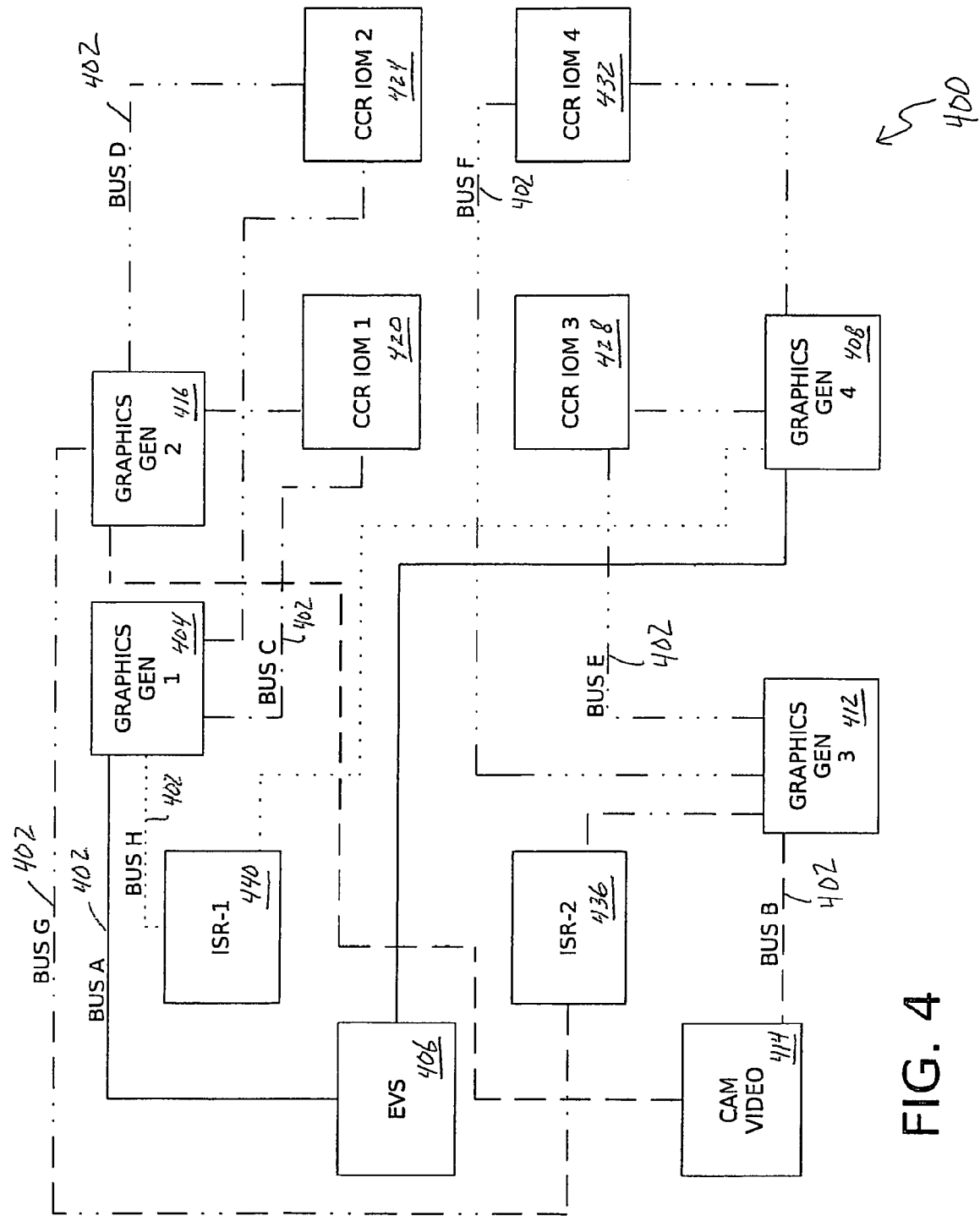
FIG. 4 is a block diagram of one embodiment of an IEEE 1394 network.

FIG. 4 is a block diagram of one embodiment of an IEEE 1394 network 400. The IEEE 1394 network 400 shown in FIG. 4 is described here as being used to communicate various types of data used in a cockpit display system for an aerospace vehicle such as a commercial or military airplane (though it is to be understood that other embodiments are implemented in other ways and/or for other applications). In the embodiment shown in FIG. 4, the network 400 comprises a quad-redundant network that makes use of eight IEEE 1394 buses 402. Each of the buses 402 has a rooted half-binary tree topology of the type described above in connection with FIG. 1 and each node that is identified as a root node comprises a gateway node 200 of the type described above in connection with FIG. 2.

One bus 402 (also referred to here as "bus A" and shown in FIG. 4 using a solid line) couples a first graphic generator node 404, an enhanced vision system (EVS) node 406, and fourth graphic generator node 408. Each node that is described here as a "graphic generator node" includes appropriate upper-layer functionality (for example, application layer functionality) to render graphics for display on a cockpit display. The EVS node 406 includes appropriate upper-layer functionality (for example, application layer functionality) to generate and process advanced visual information for display on a cockpit display (for example, three-dimensional terrain visual information for overlaying on real-time images collected by an on-board camera). The first graphic generator node 404 is the root node for bus A of network 400. The EVS node 406 is a child node of the first graphic generator node 400 and the fourth graphic generator node 408 is a child of the EVS node 406.

Another bus 402 (also referred to here as "bus B" and shown in FIG. 4 using a dashed line) couples a third graphic generator node 412, a camera video node 414, and a second graphic generator node 416. The camera video node 414 includes appropriate upper-layer functionality (for example, application layer functionality) to receive and control one or more optical sensors (that is, camera) that obtain video image data from the environment in which the aerospace vehicle travels. The third graphic generator node 412 is the root node for bus B of network 400. The camera video node 414 is a child node of the third graphic generator node 412 on bus B, and the second graphic generator node 416 is a child node of the camera video node 414 on bus B.

Another bus 402 (also referred to here as "bus C" and shown in FIG. 4 using a line comprising a pattern of a single dash followed by a single dot) couples the second graphic generator node 416, a first central computing resource (CCR) input/output module (IOM) node 420, and the first graphic generator node 404. Each node that is described here as a "CCR IOM" node includes appropriate upper-layer functionality (for example, application layer functionality) to communicate (over communication paths other than the network 400) with various flight status and control devices (for example, various sensors and/or actuators). The second graphic generator node 416 is the root node for bus C. The first CCR IOM node 420 is a child node of the second graphic generator node 416 on bus C, and the first graphic generator node 404 is a child node of the first CCR IOM node 420 on bus C.

Another bus 402 (also referred to here as "bus D" and shown in FIG. 4 using a line comprising a pattern of a single dash followed by two dots) couples the second graphic generator node 416, a second CCR IOM node 424, and the first graphic generator node 404. The second graphic generator node 416 is the root node for bus D. The second CCR IOM node 424 is a child node of the second graphic generator node 416 on bus D, and the first graphic generator node 404 is a child node of the second CCR IOM node 424 on bus D.

Another bus 402 (also referred to here as "bus E" and shown in FIG. 4 using a line comprising a pattern of a single dash followed by three dots) couples the fourth graphic generator node 408, a third CCR IOM node 428, and the third graphic generator node 412. The fourth graphic generator node 408 is the root node for bus E. The third CCR IOM node 428 is a child node of the fourth graphic generator node 408 on bus E, and the third graphic generator node 412 is a child node of the third CCR IOM node 428 on bus E.

Another bus 402 (also referred to here as "bus F" and shown in FIG. 4 using a line comprising a pattern of a single dash followed by four dots) couples the fourth graphic generator node 408, a fourth CCR IOM node 432, and the third graphic generator node 412. The fourth graphic generator node 408 is the root node for bus F. The fourth CCR IOM node 432 is a child node of the fourth graphic generator node 408 on bus F, and the third graphic generator node 412 is a child node of the fourth CCR IOM node 432 on bus F.

Another bus 402 (also referred to here as "bus G" and shown in FIG. 4 using a line comprising a pattern of a two dashes followed by two dots) couples third graphic generator node 412, a second integrated surveillance resource (ISR) node 436, and the second graphic generator node 416. Each node that is described here as an "ISR" node includes appropriate upper-layer functionality (for example, application layer functionality) to generate terrain information such as collision avoidance information. The third graphic generator node 412 is the root node for bus G. The second ISR node 436 is a child node of the third graphic generator node 412 on bus G, and the second graphic generator node 416 is a child node of the second ISR node 436 on bus G.

Another bus 402 (also referred to here as "bus H" and shown in FIG. 4 using a dotted line) couples first graphic generator node 404, a first ISR node 440, and the fourth graphic generator node 408. The first graphic generator node 404 is the root node for bus H. The first ISR node 434 is a child node of the first graphic generator node 404 on bus H, and the fourth graphic generator node 408 is a child node of the first ISR node 440 on bus H.

Deterministic communication is implemented in the IEEE 1394 network 400 of FIG. 4 by using the techniques described above in connection with FIGS. 1-2 and 3A-3B. The root nodes of each bus 402 are pre-assigned and therefore the IEEE 1394b root election algorithm need not be performed in order to elect a root node for each of the buses 402. By not using the IEEE 1394b root election algorithm, the unbounded delays associated with performing the IEEE 1394b root election algorithm to elect a root node for each bus 402 can be avoided.

Each type of data that is transmitted in the IEEE 1394b network 400 is pre-assigned a particular IPV6 traffic class. Each IPV6 traffic class used in the network 400 is mapped to a particular IEEE 1394b class of service and each IPV6 traffic class that is mapped to an asynchronous IEEE 1394b class of service is also mapped to a particular IEEE 1394b priority value. The TC-to-COS mappings are assigned so that time-critical data (such as flight-critical data) is pre-assigned to an isochronous IEEE 1394b class of service. Also, in such an embodiment, isochronous IEEE 1394b service bandwidth and time slots are pre-assigned to the various types of time-critical data based on knowledge of the network 400 and the various applications performed by the nodes of the network 400. This pre-assignment (also referred to here as "pre-scheduling") eliminates the need to perform the IEEE 1394b bandwidth and time-slot contention algorithms to resolve bandwidth and time-slot contentions that otherwise would occur, thereby avoiding the unpredictable time and delays needed for such algorithms to complete.

In such an embodiment, the use of gateway nodes of the type described above in connection with FIG. 2 as root nodes of the buses 402 (with the common network layer functionality described above) and the mapping of IPV6 traffic classes to IEEE 1394b class of services and to IEEE 1394b priority values, enables video and graphic database data (for example, the enhanced vision, surveillance, and terrain data)—which is typically transmitted using IEEE 1394b isochronous traffic—to be communicated over the network 400 as IEEE 1394b asynchronous data while still achieving a desired level determinism. This enables the IEEE 1394b isochronous bandwidth and time slots available in the network 400 to be used for flight-critical data (which demands even higher levels of determinism) while communicating such video and graphic database data as IEEE 1394b asynchronous traffic. In this way, appropriate levels of determinism can be achieved in an IEEE 1394b network 400 for both types of data traffic (that is, flight-critical and video and graphic database traffic), which typically would not be otherwise possible in an IEEE 1394 network. Moreover, in the embodiment shown in FIG. 4, each of the root nodes are quad-redundant and implement automatic protection switching (in the manner described above in connection with FIG. 2) among the IEEE 1394 buses to which that node is coupled. The approach shown in FIG. 4, which makes use of a rooted half-binary tree topology for each bus and root nodes implemented using the gateway node of FIG. 2, can reduce the cost and weight associated with such a network.

Although a particular embodiment of an IEEE 1394b network is described here in connection with FIG. 4, it is to be understood that the techniques described here can be used in other embodiments and/or in other applications. The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:
1. A node comprising:
a plurality of IEEE 1394 subnet interfaces for connecting to a plurality of IEEE 1394 buses, wherein each of the plurality of IEEE 1394 subnet interfaces comprises a respective IEEE 1394 physical layer for establishing a physical layer connection with a respective one of the plurality of IEEE 1394 buses and a respective IEEE 1394 link layer for communicating over the respective one of the plurality of IEEE 1394 buses, wherein at least the IEEE 1394 physical layers for the plurality of subnet interfaces do not share hardware;
at least one programmable processor that executes software that comprises common network layer functionality that interacts with all of the plurality of IEEE 1394 subnet interfaces and routes IEEE 1394 data packets among the plurality of IEEE 1394 buses.

2. The node of claim 1, wherein the node further comprises memory in which at least one buffer is established for each of the IEEE 1394 subnet interfaces, wherein the common network layer functionality manages the buffer for each of the IEEE 1394 subnet interfaces.

3. The node of claim 2, wherein the node implements a space-partitioning policy in which access to the memory associated with each subnet interface is controlled.

4. The node of claim 2, wherein each buffer comprises a buffer size, a minimum queue depth threshold, and a maximum queue-depth threshold, wherein the common network layer functionality routes IEEE 1394 data packets among the plurality of IEEE 1394 buses as a function of at least one of the buffer size, the minimum queue depth threshold, and the maximum queue-depth threshold.

5. The node of claim 4, wherein the common network layer functionality uses a random early dropping algorithm to forward IEEE 1394 data packets among the plurality of IEEE 1394 buses.

6. The node of claim 1, wherein each IEEE 1394 subnet interface comprises a bus manager and a transaction layer.

7. The node of claim 1, wherein the common network layer functionality encapsulates logical data packets into IEEE 1394 data packets.

8. The node of claim 7, wherein the logical data packets comprise IPV6 data packets.

9. The node of claim 7, wherein the common network layer functionality maps a traffic class associated with each logical data packet to an IEEE 1394 class of service for the IEEE 1394 data packet into which that logical data packet is encapsulated.

10. The node of claim 9, wherein the common network layer functionality maps a traffic class associated with each logical data packet to an IEEE 1394 priority for the IEEE 1394 data packet into which that logical data packet is encapsulated.

11. The node of claim 1, further comprising at least one non-IEEE 1394 subnet interface for communicating over a non-IEEE 1394 bus, wherein the common network layer functionality interacts with all of the plurality of IEEE 1394 subnet interfaces and the non-IEEE 1394 subnet interface and routes IEEE 1394 data packets and non-IEEE 1394 data packets among the plurality of IEEE 1394 buses and the non-IEEE 1394 buses.

12. The node of claim 11, wherein the non-IEEE 1394 subnet interface comprises at least one of a wired subnet interface and a wireless subnet interface.

13. The node of claim 1, wherein the common network layer functionality implements protection switching among the plurality of IEEE 1394 subnet interfaces.

14. The node of claim 1, wherein the software comprises a scheduler that implements a time-partitioning policy that allocates a portion of the programmable processor execution time to each of the subnet interfaces.

15. The node of claim 1, wherein the node acts a root node for at least one of the plurality of IEEE 1394 buses and a non-root node for at least one of the other plurality of IEEE 1394 buses.

16. A system comprising:
a plurality of nodes that communicate with one another over a plurality of IEEE 1394 buses;
wherein each of the plurality of nodes comprises a plurality of IEEE 1394 subnet interfaces for connecting to the plurality of IEEE 1394 buses, wherein each of the plurality of IEEE 1394 subnet interfaces comprises a respective IEEE 1394 physical layer for establishing a physical layer connection with a respective one of the plurality of IEEE 1394 buses and a respective IEEE 1394 link layer for communicating over the respective one of the plurality of IEEE 1394 buses, wherein at least the IEEE 1394 physical layers for the plurality of subnet interfaces do not share hardware;
wherein each of the plurality of nodes implement common network layer functionality that interacts with all of the plurality of IEEE 1394 subnet interfaces of the respective node and routes IEEE 1394 data packets among the plurality of IEEE 1394 buses.

17. The system of claim 16, wherein each IEEE 1394 subnet interface comprises a respective bus manager and a respective transaction layer.

18. The system of claim 16, wherein the common network layer functionality for each node encapsulates logical data packets into IEEE 1394 data packets.

19. The system of claim 18, wherein the common network layer functionality for each node maps a traffic class associated with each logical data packet to an IEEE 1394 class of service for the IEEE 1394 data packet into which that logical data packet is encapsulated.

20. The system of claim 19, wherein the common network layer functionality for each node maps a traffic class associated with each logical data packet to an IEEE 1394 priority for the IEEE 1394 data packet into which that logical data packet is encapsulated.

21. The system of claim 16, wherein at least one of the plurality of nodes further comprises at least one non-IEEE 1394 subnet interface for communicating over a non-IEEE 1394 bus, wherein the common network layer functionality for that at least one node interacts with all of the plurality of IEEE 1394 subnet interfaces for that at least one node and the non-IEEE 1394 subnet interface and routes IEEE 1394 data packets and non-IEEE 1394 data packets among the plurality of IEEE 1394 buses and the non-IEEE 1394 buses for that at least one node.

22. The system of claim 16, wherein the common network layer functionality for each node implements protection switching among the plurality of IEEE 1394 subnet interfaces.

23. A method comprising:
receiving IEEE 1394 data packets from a plurality of IEEE 1394 buses using separate IEEE 1394 subnet interfaces, wherein respective IEEE 1394 data packets are received from each of the plurality IEEE 1394 buses using a respective IEEE 1394 subnet interface, wherein each IEEE 1394 subnet interface comprises a respective IEEE 1394 physical layer for establishing a physical layer connection with a respective one of the plurality of IEEE 1394 buses and a respective IEEE 1394 link layer, wherein at least the IEEE 1394 physical layers for the plurality of IEEE 1394 subnet interfaces do not share hardware; and
forwarding the IEEE 1394 data packets among the plurality of IEEE 1394 buses using a common network layer.

24. The method of claim 23, wherein forwarding the IEEE 1394 data packets among the plurality of IEEE 1394 buses using the common network layer comprises forwarding the IEEE 1394 data packets among the IEEE 1394 buses using a random early dropping algorithm.

25. The method of claim 23, further comprising encapsulating logical data packets into IEEE 1394 data packets using the common network layer.

26. The method of claim 23, further comprising mapping a traffic class associated with each logical data packet to an IEEE 1394 class of service for the IEEE 1394 data packet into which that logical data packet is encapsulated.

27. The method of claim 26, further comprising mapping a traffic class associated with each logical data packet to an IEEE 1394 priority for the IEEE 1394 data packet into which that logical data packet is encapsulated.

28. Apparatus comprising a non-transitory storage medium tangibly embodying program instructions, the program instructions comprising instructions operable to cause a programmable processor to:
receive IEEE 1394 data packets from a plurality of IEEE 1394 buses using separate IEEE 1394 subnet interfaces, wherein respective IEEE 1394 data packets are received from each of the plurality IEEE 1394 buses using a respective IEEE 1394 subnet interface, wherein each IEEE 1394 subnet interface comprises a respective IEEE 1394 physical layer for establishing a physical layer connection with a respective one of the plurality of IEEE 1394 buses and a respective IEEE 1394 link layer, wherein at least the IEEE 1394 physical layers for the plurality of IEEE 1394 subnet interfaces do not share hardware; and
forward the IEEE 1394 data packets among the plurality of IEEE 1394 buses using a common network layer.

* * * * *